Nov. 11, 1969
L. E. MULL
3,477,408
PORTABLE AUTOMATIC ANIMAL WATERER
WITH QUICK DISCHARGE MECHANISM
Filed Nov. 13, 1967
2 Sheets-Sheet 1
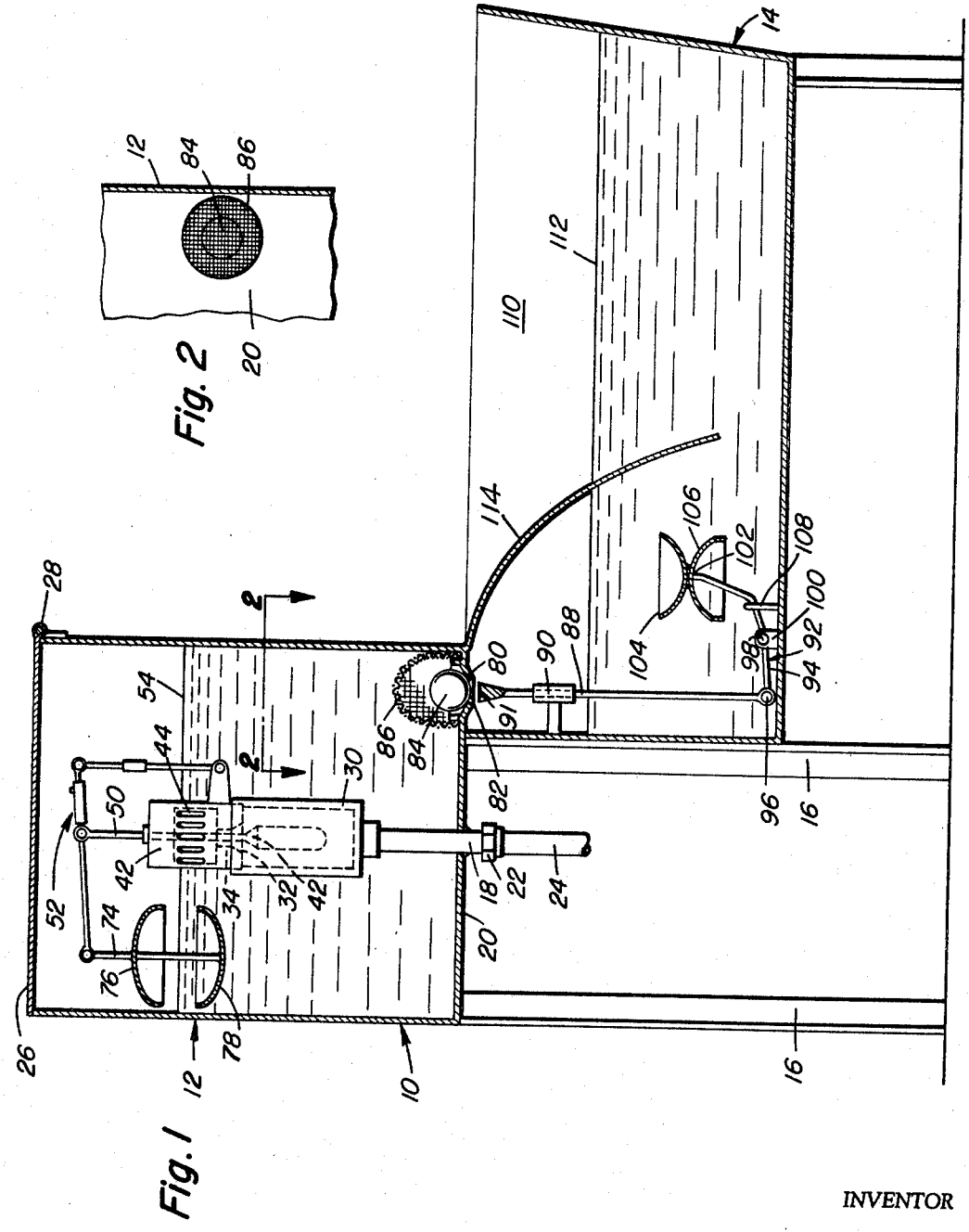
INVENTOR
Leonard E. Mull
BY Gustave Miller
ATTORNEY

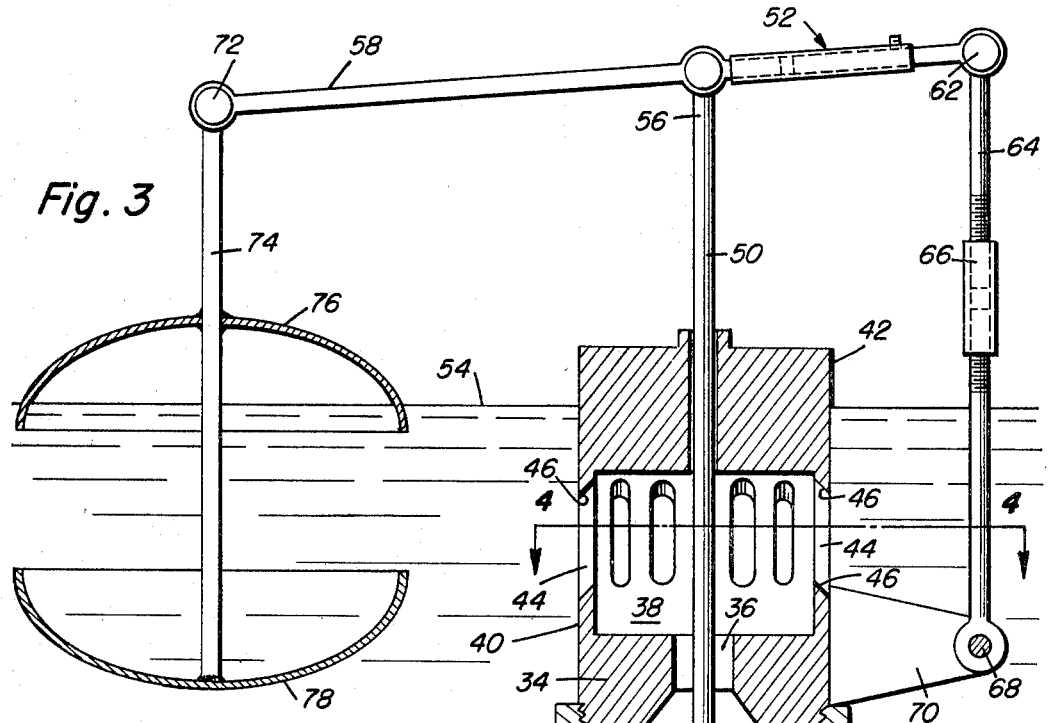
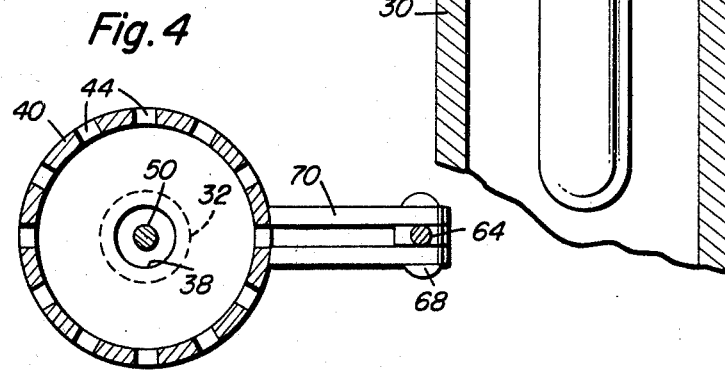

United States Patent Office 3,477,408
Patented Nov. 11, 1969

3,477,408
PORTABLE AUTOMATIC ANIMAL WATERER
WITH QUICK DISCHARGE MECHANISM
Leonard E. Mull, Rte. 3, Clover, S.C. 29710
Filed Nov. 13, 1967, Ser. No. 682,169
Int. Cl. A01k 7/02; F16k 31/18
U.S. Cl. 119—78                                12 Claims

ABSTRACT OF THE DISCLOSURE

This invention relates to a readily portable animal watering trough and to a valve mechanism therefor, which valve mechanism is also capable of being used in the water box of a toilet or commode. The valve mechanism includes a water inlet valve having a valve lifted to closed position against a valve seat by a float, and a quick discharge water valve closed by a water weighted float which, when lifted by actuating mechanism, discharges the water from the box to either a commode or to a watering trough, as the case may be. In the watering trough combination, the discharge valve actuating mechanism is located in the watering trough, but is separated by a shield from the animal drinking area. In addition, the water inlet to the water box has a hose connection, and the box and trough are provided with legs, so that the watering trough may be carried to and set up at any desired location.

OBJECTS OF INVENTION

It is an object of this invention to provide a readily portable animal watering trough which may be connected up to a hose at any convenient location, and wherein the animal drinking area is separated by a shield from the trough refilling mechanism, and wherein the same valve mechanism and the water box of the watering trough are also capable of being used with a toilet or commode.

A further object of this invention is to provide a water box wherein the float lifts the inlet valve against a valve seat to closed position, and wherein a float discharge valve is lifted off its seat to discharge the water from the box to the watering trough or commode.

A further object of this invention is to provide an animal waterer wherein the animal does not at any time come into contact with any actuating mechanism and wherein the water level in the trough, when sufficiently low, serves to actuate the valve as a quick discharge mechanism in the water box to provide substantially a complete new supply of water, rather than dribble it in a little at a time, as customary with most animal waterers.

SUMMARY OF INVENTION

In brief, the invention consists of a water box and valve mechanism with an actuating mechanism extending externally of the water box either for manual actuation in the case of a commode, or for automatic operation by the level of the water in a watering trough for animals. In the water box, a float, connected by pivoted levers to a valve stem of an upwardly closing valve against a valve seat of a water inlet, refills the box when it has been emptied, a hose connection being provided for connection to a hose, together with legs, or even with lockable wheels on the legs, for ready portability. A ball float in a cage over a discharge valve seat is opened by a push rod from the bottom outside the water box, which may be connected to a manually operated lever for a commode, or to a float in a watering trough for automatic operation when the trough water level gets low, to completely refill the trough in a single operation, not by dribbling, as usual. The float mechanism in the trough is separated by a shield from the animal drinking area, so that it cannot be disturbed by an animal and thus is much more durable.

DESCRIPTION OF FIGURES

With the above and related objects in view, this invention consists in the retails of construction and combination of parts, as will be more fully understood from the following description, when read in conjunction with the accompanying drawing, in which:

FIG. 1 is a sectional view through the portable animal waterer of this invention.

FIG. 2 is a detailed sectional view on line 2—2 of FIG. 1.

FIG. 3 is an enlarged partly sectional view of the water inlet control valve.

FIG. 4 is a sectional view on ilne 4—4 of FIG. 3.

DETAILED DESCRIPTION

There is shown at 10 the portable automatic animal waterer and valve mechanism therefor. This includes a water box 12, an animal watering trough 14 attached thereto, and legs or supports 16 for supporting the water box 12 and trough 14 at a desired location. A detachable water supply is provided by water inlet pipe 18 extending through the bottom 20 of the water box 12 and terminating in a hose connection 22 to which a hose 24, of conventional construction, is readily attached or detached. If desired, wheels or casters may be added to the bottom of the legs or supports 16. To keep trash or debris from falling into the water box 12, a cover 26 is hinged thereto at 28 to close the top, yet permit ready access thereto if desired.

Supported on and in communication with the inlet pipe 18 within the water box 12 is a cylindrical valve housing 30 into the top of which is threaded and supported an inverted inlet valve seat 32. This valve seat 32 is in the bottom surface of a valve wall 34 through which extends a water inlet aperture 36 concentric with the valve seat 32. This inlet aperture 36 leads to a chamber 38 formed by a cylindrical wall 40 supporting a bushing 42. The cylindrical chamber wall 40 is provided with an annular row of apertures 44 which are downwardly slanted at 46 so that water passing therefrom into the water box 12 will be directed downwardly and thus not splash toward the top of the water box 12.

In order to controllably close the entry of water to the box 12, a valve 48, complementary to valve seat 32, is supported therebelow by a valve stem 50 which extends upwardly through the chamber inlet 36, the chamber 38, and an opening in bushing 42 to above the bushing 42 where it is controlled by a float means generally shown at 52 so as to control the opening and closing of the valve 48 according to the water level 54 in the water box, the water level 54 being shown below its maximum when the box 12 is full. If a non-adjustable water level above the bushing 42 is all that is needed, the float means 52 may be a simple float member attached directly to the valve stem 50 on the upper portion of the valve stem 50. However, substantial adjustment of the water level 52 may be desired, and to provide this, the top end 56 of the valve stem 50 is pivotally connected at an intermediate point in a somewhat horizontal lever 58 which is adjustable in length at 60. One end of lever 58 is pivotally connected at 62 to the top end of a somewhat vertical lever or rod 64. This lever or rod 64 may also be provided with length adjustment means, such as a threaded sleeve 66. The bottom end of lever or rod 64 is pivoted at 68 to an ear 70 rigidly extending from the chamber wall 40 of bushing 42.

The opposite end of lever 58 is pivotally connected at 72 to the top of a float and weight stem or lever 74. Two oppositely extending or inverted cups 76 and 78 are mounted on stem or lever 54 in spaced apart relation. The upper cup 76 is extended downwardly and traps air therein above the water lever 54 and thus provides a float, while the lower cup 78, extending normally in an upward position, catches water and provides a weight to quickly operate the valve when the water box is being emptied. However, the motion of cups 76 and 78 is limited by the mechanical construction and does not follow the water lever downwardly very far, but does limit the rise of the water level to close off the inlet valve 48 into valve seat 32.

In order to discharge water from the water box 12, either to the watering trough 12 that is shown, or to a commode, if desired, a water discharge partly spherical valve seat 80 is provided with an opening 82 through the bottom 20 of the water box 12. A float ball valve 84, complementary to spherical valve seat 80 is provided and held thereover by a foraminated cage 86. A connecting rod 88 passing through a guide sleeve 90 is provided at its top with a concave tappet 91 for extending through valve seat opening 82 to dislodge ball float valve 84 therefrom when desired, permitting the entire contents to the water box 12 to be discharged therefrom before the valve opening 82 is closed to permit the water box 12 to be refilled. At its bottom end, the connecting rod 88 is provided with actuating means 92 for lifting or dropping it as desired.

In the case of a commode, this actuating means may be a suitable handle operatively connected to the rod 88 for operating it as desired. In the case of the watering trough 14 as illustrated, the actuating means 92 is a crank arm lever 94 pivoted at one end 96 to the bottom of rod 88, and at an intermediate point 98 to a pivot ear 100 supported on the bottom of the trough 14. At the end 102 of crank arm 94 there are provided another pair of inverted weight and float cups similar to that at 76 and 78, but this time reversely inverted, with the upper cup 104 extending upwardly to catch water and provide a weight, and the lower cup 106 extending downwardly to catch air and provide a float. Secured to the bottom of trough 14 and extending over the arm 94 is a loop 108 limiting the movement of the arm 94. Extending from a side of the trough 14 over this control mechanism 92 is a shield 114 separating such control mechanism 92 from the animal drinking area 110 at the water level 112.

OPERATION

As an animal watering trough, the entire device may be readily transported to any suitable area which can be reached by a hose 24 from a suitable water supply. When the animal drinks the water in trough 14 until its level 112 is below that which the float cup 106 will support the control mechanism 92, the control rod 88 is lifted to push tappet 91 up to dislodge ball valve 84 from its valve seat 80 permitting all the water in the box 12 above the seat 80 to discharge through the opening 82 into the trough 14. As the box 12 empties, weight cup 78 will drop down along with the float cup 76, unseating valve 48 from its seat 32 and permitting water to refill the box 12 until the float cup 76 along with weight cup 78, is lifted to lift stem 50 and valve 48 to closed position against the valve seat 32. As will be apparent, while the water level 54 may drop to the bottom of the box 12 when box 12 is empty, the movement of weight and float stem 74 is very limited, and when the box is emptied the discharge float ball valve 84, trapped by the cage 86, will drop down to valve closing position, permitting the box to refill. Meantime, the water level 112 in trough 14 rises substantially above the control mechanism at 92. Thus the trough 14 is almost entirely emptied each time when the level 112 drops down far enough to actuate mechanism 92, and a fresh supply of water fills the trough 14. This is in contrast to the usual animal actuated watering trough, where the animal's nozzle must contact a valve control member to dribble in small amounts of water as the animal is drinking, with most of the water in the trough remaining, thus tending to stagnate. In this invention, an almost entirely new supply of water is filled into the trough when the level drops to below a drinkable level.

It will be noted that the valve housing 30 is about three times the diameter of the inlet pipe 18, the valve housing 30 being about 1½ inches diameter, the inlet pipe being about ½ inch. This eliminates a buildup of pressure on the bottom of male valve 48 that could prevent valve 48 from opening down from the female valve 32, if the diameter of the housing were too small. There must be enough room in the valve housing 30 for the incoming water to go around the male valve 48 and let it open when the water level 54 drops down below the weighted water cup 78. Then, the weight of the cup 78 and of valve 48 is enough to overcome any pressure tending to hold the valve 48 closed against its valve seat 32.

In addition to serving for watering animals, it may serve also in medication for animals, such as in worming or in treating colds, by putting one dose in trough 14 and another dose in tank or box 12.

In the drawings, like numbers refer to like parts, and for the purposes of explication, marshalled below are the numbered parts of the improved readily portable automatic waterer for animals and valve mechanism therefor:

10—readily portable automatic waterer for animals and valve mechanism therefor
12—water box
14—watering trough
16—legs or support
18—inlet pipe to 12
20—bottom of 12
22—hose connection
24—hose
26—cover for top of 12
28—hinge for 26 to 12
30—valve housing
32—inverted valve seat
34—valve wall
36—concentric water inlet aperture to chamber 38
38—chamber
40—chamber wall
42—bushing
44—annular row of apertures in 40
46—down slant of 44
48—inlet valve
50—valve stem
52—float means for 50
54—water lever in box 12
56—top end of valve stem 50
58—somewhat horizontal lever of 52
60—length adjustment in 58
62—pivot connection of 58 to 64
64—somewhat vertical lever or connecting rod
66—length adjustment in 64
68—pivot at bottom of 64
70—pivot ear on 40 for 68
72—pivot of 58 to 74
74—float and weight cup stem or lever
76—upper inverted float cup on 74
78—lower upright weight cup on 74
80—partly spherical valve seat in 20
82—water discharge opening through 82
84—float ball valve
86—cage for ball 84
88—connecting rod to 92
90—sleeve guide for 88
91—concave tappet on top of 88
92—discharge valve control mechanism
94—crank arm
96—pivot 94 to 88
98—pivot 94 to 100
100—pivot ear on bottom of trough 14
102—end of 94
104—upper weight cup on end 102 of 94
106—lower inverted float cup on end 102 of 94

108—limit loop for 94
110—trough drinking area
112—water level in 14
114—shield

Although this invention has been described in considerable detail, such description is intended as being illustrative rather than limiting, since the invention may be variously embodied.

Having thus set forth and disclosed the nature of this invention, what is claimed is:

1. A valve mechanism and a water box, the water box having a box bottom and sides for containing water, a water inlet pipe supported on said box bottom for admitting water therethrough, a valve seat supported on said inlet pipe, a valve stem extending up through said valve seat, a valve supported on said stem below said valve seat, and float means in said water box connected to said valve stem for lifting said valve stem to close said valve against said valve seat when the water level in said box reaches a predetermined level said float means comprising a pair of cups one above the other and inverted one relative to another defining a quick discharge actuator.

2. The valve mechanism and water box of claim 1, said float means comprising a float, a float stem secured to and extending above said float, a somewhat horizontal lever pivoted at one end to said float stem and at its opposite end to the top end of a somewhat vertical rod or lever, said vertical rod or lever being pivoted at its bottom end to a rigidly supported pivot, said valve stem being pivoted at its top end to an intermediate portion of said somewhat horizontal lever, whereby the water level will actuate the float to control said valve.

3. The valve mechanism and water box of claim 1, and a valve stem bushing supported on and above said valve seat, said valve stem extending upwardly through said bushing, said bushing including a perforated wall supported on said valve seat, the perforations in said wall being slanted downwardly, water from said valve seat, when open, passing downwardly through said perforated wall to the water box.

4. The valve mechanism and water box of claim 2, and length adjusting means in at least one of said pivoted levers.

5. The valve mechanism and water box of claim 1, a water discharge valve seat connected through said box bottom, a free float valve for closing said water discharge valve seat, a cage over said water discharge valve seat and free float valve for confining said free float valve to return to said discharge valve seat when the water level in said water box has dropped to said discharge valve seat, and free float valve lifting means extending through said valve discharge seat for actuating said free float valve to water discharge position.

6. The valve mechanism and water box of claim 5, said free float valve lifting means comprising a vertical push rod slidable through a guide sleeve having its top end in position to lift said free float valve off its seat, and an actuating lever pivoted at one end to the bottom end of said vertical rod.

7. The valve mechanism and water box of claim 6, in combination with an animal watering trough, a watering trough float secured to the opposite end of said actuating lever, said actuating lever being pivoted intermediate its ends to a fixed pivot means.

8. The valve mechanism and water box and watering trough of claim 7, and a shield depending over said connecting rod, actuating lever and float thereon and terminating above the bottom of the watering trough separating said connecting rod, actuating lever and float from the animal watering area of said watering trough.

9. The valve mechanism, water box and watering trough of claim 8, said float connecting to said float stem in said water box and said float connected to said actuating lever in said watering trough each comprising a pair of cups inverted one relative to the other.

10. The valve mechanism, water box and watering trough of claim 9, the upper cup of said float cups in said water box extending downwardly, the upper cup of said float cups in said watering trough extending upwardly.

11. The valve mechanism, water box and watering trough of claim 7, and a readily disconnectable hose connection on said water inlet pipe external of said water box.

12. The valve mechanism, water box and watering trough of claim 11, and leg means for supporting said water box and watering trough at a desired location thus providing ready portability thereto.

References Cited
UNITED STATES PATENTS

| | | | |
|---|---|---|---|
| 235,701 | 12/1880 | Ray | 119—78 |
| 1,520,914 | 12/1924 | Spearing | 137—435 |
| 1,644,660 | 10/1927 | Arkfeld | 119—78 |
| 1,783,891 | 12/1930 | Thibert | 137—21 |
| 1,961,092 | 5/1934 | Smith | 119—80 |
| 1,982,062 | 11/1934 | Matthews | 137—104 |
| 2,986,155 | 5/1961 | Doyle | 137—436 X |
| 3,052,215 | 11/1962 | Shold | 119—78 |

ALDRICH F. MEDBERY, Primary Examiner

U.S. Cl. X.R.

119—80; 137—403, 416 X